United States Patent [19]

Gibbs et al.

[11] 4,017,442

[45] Apr. 12, 1977

[54] STRUCTURED-PARTICLE LATEXES

[75] Inventors: Dale S. Gibbs, Midland, Mich.; Earl H. Wagener, Concord, Calif.; Ritchie A. Wessling, Midland, Mich.

[73] Assignee: The Dow Chemical Company, Midland, Mich.

[22] Filed: Apr. 21, 1975

[21] Appl. No.: 569,724

[52] U.S. Cl. .................. 260/29.6 RB; 260/29.6 T; 260/29.6 CM; 260/29.7 DP; 260/29.7 UP; 260/29.7 T; 260/29.7 AT

[51] Int. Cl.$^2$ ........................................ C08L 33/08

[58] Field of Search .............. 260/29.6 RB, 29.6 T, 260/29.6 GM, 29.7 DP, 29.7 UP, 29.7 T, 29.7 AT, 879, 884

[56] References Cited

UNITED STATES PATENTS

| | | | |
|---|---|---|---|
| 3,072,588 | 1/1963 | Vitkuske et al. | 260/80.6 |
| 3,254,044 | 5/1966 | Gunderman et al. | 260/29.6 RB |
| 3,316,199 | 4/1967 | Murphy | 260/29.6 RB |
| 3,673,282 | 6/1972 | Baer | 260/29.6 RB |
| 3,692,871 | 9/1972 | Baer | 260/879 |
| 3,700,609 | 10/1972 | Tregear et al. | 260/884 |
| 3,745,196 | 7/1973 | Lane et al. | 260/884 |
| 3,763,119 | 10/1973 | DeMarco et al. | 260/80.96 |

FOREIGN PATENTS OR APPLICATIONS 1,093,472    12/1967    United Kingdom

*Primary Examiner*—M. J. Welsh
*Attorney, Agent, or Firm*—I. A. Murphy

[57] ABSTRACT

Structured-particle latexes are prepared from nonionic or slightly cationic latexes, either preformed or polymerized in situ, by emulsion polymerizing monomeric materials which include an ethylenically unsaturated, activated-halogen monomer such as vinylbenzyl chloride in the absence of a sufficient amount of a surfactant to initiate new particles whereby the activated-halogen monomer is copolymerized on the surface of the existing particles which are dispersed in aqueous media. To the resulting structured particle latex may then be added conventional cationic surfactants to provide greater stability. The cationic latexes are suitable for coatings.

17 Claims, No Drawings

STRUCTURED-PARTICLE LATEXES

BACKGROUND OF THE INVENTION

1. Field of the Invention

The invention is concerned with latex compositions and with methods for the preparation of such latexes. More particularly, these latexes are aqueous colloidal dispersions of polymers having reactive halogens at or near the surface of the dispersed particles.

2. Description of the Prior Art

In the U.S. Pat. No. 3,072,588 there are described latexes of polymers of a vinylbenzyl halide and a method of preparation of such products. The method involves emulsion polymerization of monomers consisting of at least 5 weight percent of a vinylbenzyl halide for a period of from 2 to 60 hours at a temperature of from 0° to 30° C, using a water soluble initiator/reducing activation combination and an anionic emulsifier. In the resulting latexes the polymerized vinyl halide is distributed throughout the particles comprising the latex.

SUMMARY OF THE INVENTION

This invention is concerned with a latex having structured particles consisting of a water-insoluble, nonionic organic polymer core encapsulated with a layer of a copolymer of an ethylenically unsaturated, active-halogen monomer and an ethylenically unsaturated nonionic monomer which is devoid of an activated halogen said structured particles having activated-halogens at or near the outer surface and being dispersed in aqueous media containing a small amount of a cationic surfactant. Such latexes are obtained by copolymerizing under emulsion polymerization conditions an ethylenically unsaturated, activated-halogen monomer onto the particle surface of a latex of a nonionic polymer which is slightly cationic through the presence of adsorbed cationic surfactant. The latexes are suitable for coatings.

DESCRIPTION OF THE PREFERRED EMBODIMENTS

The preparation of the products of the present invention requires a starting latex comprising solid polymer particles colloidally dispersed in water, the composition and method of preparation of which are known per se, but which is subsequently modified by the process of the invention so that the particles of the starting latex are encapsulated with a copolymer of an ethylenically unsaturated activated-halogen monomer with a hydrophobic, ethylenically unsaturated monomer. The resulting latex comprises colloidally dispersed particles having reactive halogen groups on the surface of the particles.

There are many known latexes which may serve as the starting latex in the present invention and the composition is not narrowly critical. Such latexes are prepared by processes well known in the art. Preformed latexes having substantially no residual monomers may be used but advantageously these starting latexes can be prepared by emulsion polymerization as the first step in the preparation of the present latex products wherein some monomers and some free-radicals remain at the start of modifications according to this invention. The starting latex, or components and methods for making such latex, are selected from the known latex compositions which are substantially devoid of anionic groups and/or anionic surfactants adsorbed or otherwise attached to the polymer particles comprising the latex. Preferably the latex is slightly cationic, usually from the presence of a small amount of a cationic surfactant. For best results the starting latex should not contain an amount of a surfactant sufficient to initiate new particles when additional monomer is introduced. The composition of the polymeric component of the starting latex also does affect certain properties of the final product since it constitutes a major portion of the total mass of the product. Thus, a selection will be made somewhat according to the desired polymeric properties known to be possessed by these prior art materials to supplement the properties which are attributable to the encapsulating component of the invention. Thus, as an illustration but not a limitation, for the predominant portion of the products, a starting latex which is film-forming at room temperature will be selected but there are uses for which a non-film forming starting latex would be selected, such as for plastic pigments. Ordinarily the starting latexes have a particle size of from about 500 Angstroms to about 10,000 Angstroms, preferably from about 800 Angstroms to about 3000 Angstroms. If the products are to be used in a manner such as to require certain commonly recognized characteristics, for example, low electrolyte concentration, such characteristics will be considered when selecting the starting latex and the ingredients to be used in carrying out subsequent parts of the process. Such selections are within the skill of the art and are not considered inventive aspects of the novel compositions and method herein described.

Typically the starting latexes are obtained by emulsion polymerization of one or more monomers. Such monomers are represented by the same monomers listed below for copolymerization with the activated-halogen monomers subsequent to preparation of the starting latex:

The starting latexes also may consist essentially of polymers which are not prepared readily from monomers by emulsion polymerization, either because no substantial polymerization at a commercially acceptable rate is obtained under usual emulsion polymerization conditions, such as with isobutene, or because a particular form of the polymerized monomer is desired, for example stereospecific polyisoprene, stereospecific polybutadiene and the like. Representative pre-formed polymers are polymers and copolymers of the mono-olefins having from 2 to 20 carbon atoms such as ethylene, propylene, 1-butene, 2-butene, isobutene, pentene, hexene, octene, dodecene, hexadecene, octadecene, and especially those mono-olefins having up to 8 carbon atoms. Especially common types are the various ethylene/propylene copolymers.

Illustrative of still other polymers which may be constituents for the starting latex of the present invention are alkyd resins, block and graft copolymers; e.g., styrene/butadiene graft and block copolymers; epoxy resins such as the reaction products of epichlorohydrin and bisphenol-A; and thermosettable vinyl ester resins; e.g., the reaction products of approximately equimolar amounts of a polyepoxide and an unsaturated monocarboxylic acid such as acrylic acid and methacrylic acid or unsaturated fatty acids such as oleic acid.

Methods for preparing the above described polymers and methods for converting the polymers to latexes are well known and are not a part of this invention.

A starting latex will not be selected which contains groups which would inhibit free-radical polymerization or which will be substantially cross-linked under emulsion polymerization conditions, if it is desired to make a film-forming product.

The particles of the starting latex are encapsulated with a thin layer of a copolymer of an ethylenically unsaturated activated-halogen monomer either by adding the activated-halogen monomer or mixture of such monomers to the reaction mixture of the starting latex before all of the monomers are converted to polymer or by adding the activated-halogen monomer preferably together with a hydrophobic monomer to the starting latex containing essentially no residual monomers, then initiating and continuing polymerization of the thus-added monomers to substantially complete conversion.

The activated-halogen monomers should not be so reactive as to hydrolyze readily in an aqueous medium. Such suitable monomers are represented by ethylenically unsaturated benzylic chloride or bromide monomers, ethylenically unsaturated, aliphatic bromide monomers and ethylenically unsaturated, aliphatic iodide monomers. Specific preferred activated halogen monomers are represented by vinylbenzyl chloride, vinylbenzyl bromide, 2-chloromethylbutadiene, vinyl bromide and bromo-alkyl acrylate or bromoalkyl methacrylate especially 2-bromoethyl acrylate or 2-bromoethyl methacrylate.

The activated-halogen monomers are oil soluble, are easy to polymerize in emulsion, do not inhibit free radical polymerization and diffuse at a satisfactory rate through the aqueous medium of a latex to the latex particle.

The hydrophobic, ethylenically unsaturated monomer which may be copolymerized with the activated-halogen monomer in the practice of the present invention may be selected from the known wide variety of nonionic, ethylenically unsaturated monomers which are polymerizable in aqueous emulsion to form a water-insoluble polymer. These monomers are well-known in the art and hence are illustrated below only by representative examples. The nonionic, ethylenically unsaturated monomers are represented by, but not restricted to, hydrocarbon monomers such as the styrene compounds, e.g., styrene, α-methylstyrene, ar-methylstyrene, ar-ethylstyrene, α,ar-dimethylstyrene, ar,ar-dimethylstyrene, and t-butylstyrene; the conjugated dienes, e.g., butadiene and isoprene; the hydrocarbon monomers which are modified to possess non-ionic substituents, e.g., hydroxystyrene, methoxystyrene, and cyanostyrene; the unsaturated alcohol esters such as vinyl acetate and vinyl propionate; the unsaturated ketones, e.g., vinyl methyl ketone and methyl isopropenyl ketone; the unsaturated ethers, e.g., vinylethyl ether and vinyl methyl ether; and the nonionic derivatives of ethylenically unsaturated carboxylic acids such as acrylic esters, e.g., methyl acrylate, ethyl acrylate, butyl acrylate, hexyl acrylate, 2-ethylhexyl acrylate and lauryl acrylate; methacrylic esters, e.g., methyl methacrylate, ethyl methacrylate; the maleic esters such as dimethyl maleate, diethyl maleate and dibutyl maleate; the fumaric esters, e.g., dimethyl fumarate, diethyl fumarate and dibutyl fumarate, and the itaconic esters, e.g., dimethyl itaconate, diethyl itaconate and dibutyl itaconate; and the nitriles, e.g., acrylonitrile and methacrylonitrile. While not in the preferred class, non-ionic monomers containing halogens which are not activated may be employed, such as monochlorostyrene, dichlorostyrene, vinyl fluoride and chloroprene. Also non-ionic monomers which form water-soluble homopolymers, e.g., acrylamide, methacrylamide, hydroxyethyl acrylate, and hydroxyethyl methacrylate may be mixed with the hydrophobic monomer in small amounts up to about 10 percent, based on the amount of hydrophobic monomer.

In this specification, by the term "pH independent groups" as applied to ionic groups is meant that the groups are predominantly in ionized form over a wide range in pH, e.g., 2–12.

By the term "nonionic" as applied to the monomers in this specification is meant that the monomers are not ionic per se or do not become ionic by a simple change in pH. For illustration, while a monomer containing an amine group is non-ionic at high pH, the addition of a water-soluble acid reduces the pH and forms a water-soluble salt; hence, such a monomer is not included.

In carrying out the polymerization of the activated-halogen monomer, the ratio of monomer to total polymer in the latex should be kept low at any given time during the process so as to avoid unduly swelling the latex particles. With too much swelling, i.e., too much monomer dissolved in the polymer, some polymerization may occur in the interior of the particle. With that occurrence, the reactive halogens become buried in the particle and hence are not readily available for subsequent reaction. The activated-halogen monomer is added to the starting latexes over a short period or is added as a shot in one or more increments. Optionally but preferably, a hydrophobic monomer devoid of an activated-halogen or mixture of such monomers also is added, usually in admixture with the activated-halogen monomers. The polymerization is advantageously carried out at as low a temperature as will provide a practical polymerization rate, in order to avoid hydrolyzing the activated-halogen monomer. Such temperatures range from about 0° C to about 80° C, preferably from about 50° C to about 70° C. Unless the starting latex is prepared in situ, an initiator system (catalyst) is added to activate the latex particle surface, i.e., set up a steady state concentration of free radicals. Continued addition of the initiator system after addition of the monomers can be carried out, if desired — especially when a redox system is used. The polymerization reaction is continued until the monomers are substantially completely polymerized.

In some embodiments of the invention the starting latex provides some or all of the ethylenically unsaturated, nonionic monomer which is devoid of an activated-halogen for polymerization with the activated-halogen monomer to form the encapsulating layer. In those embodiments, polymerization of the constituent monomers in the starting latex is continued to form about 85 percent to about 95 percent conversion.

The product obtained by the above-described method is a latex of which the colloidally dispersed polymer particles consist of the starting latex particles encapsulated with a bound layer having a thickness of from a monomolecular layer to about 100 angstroms consisting of a functional polymer with activated-halogen groups on the outer surface thereof.

The amount of activated-halogen monomer copolymerized in the encapsulating layer of the structured-particle latex ranges from about 0.01 milliequivalent to about 1.4 milliequivalents, preferably from about 0.04 milliequivalent to about 0.5 milliequivalent, per gram of total polymer in the latex. However, there must be a sufficient amount of the hydrophobic monomer copolymerized with the activated-halogen monomer so that for each gram of polymer in the encapsulating layer, i.e., the cap, there is not more than 3.0 milliequivalents of the copolymerized activated-halogen monomer. The proportion of activated-halogen monomer is inversely related to the particle-size of the latex being encapsulated and also is inversely related to the molecular cross-sectional area of the activated-halogen monomer. Thus, one would not use the minimum amount of activated-halogen monomer with a starting latex of the smallest particle-size.

The initiators used in the polymerization of the activated-halogen monomers are of the type which produce free-radicals and conveniently are per-oxygen compounds, for example: the inorganic peroxides such as hydrogen peroxide; the organic hydroperoxides such as cumene hydroperoxide and t-butyl hydroperoxide; the organic peroxides such as benzoyl peroxide, acetyl peroxide, lauroyl peroxide, peracetic acid and perbenzoic acid — sometimes activated by water-soluble reducing agents such as a ferrous compound, sodium bisulfite or hydroxylamine hydrochloride — and other free-radical producing materials such as 2,2'-azobisisobutyronitrile.

The organic hydroperoxides and 2,2'-azobisisobutyronitrile are preferred.

To the latex of this invention, containing particles of the starting latex encapsulated with a relatively thin coating of a copolymer of the activated-halogen monomer with a hydrophobic, ethylenically unsaturated monomer, can then be added a desired amount of an non-ionic or a cationic surfactant, such as up to about 0.25 meq. of surfactant per gram of polymer. The colloidal stability of the latex is thereby enhanced.

The surfactants which are used either in the starting latex or as additives for further stabilization of the latex products are cationic surfactants or non-ionic surfactants or mixtures thereof.

The cationic surfactants include the classes of salts of aliphatic amines, especially the fatty amines, quaternary ammonium salts and hydrates, fatty amides derived from disubstituted diamines, fatty chain derivatives of pyridinium compounds, ethylene oxide condensation products of fatty amines, sulfonium compounds, isothiouronium compounds and phosphonium compounds. Specific examples of cationic surfactants are dodecylamine acetate, dodecylamine hydrochloride, tetradecylamine hydrochloride, hexadecylamine acetate, lauryl dimethylamine citrate, octadecylamine sulfate, dodecylamine lactate, cetyl trimethyl ammonium bromide, cetyl pyridinium chloride, an ethanolated alkyl guanidine amine complex, stearyl dimethyl benzyl ammonium chloride, cetyl dimethyl amine oxide, cetyl dimethyl benzyl ammonium chloride, tetradecyl-pyridinium bromide, diisobutyl phenoxy ethoxy ethyl dimethyl benzyl ammonium chloride, 1-(2-hydroxyethyl)-2-(mixed pentadecyl and heptadecyl)-2-imidazoline, resin amine ethoxylate, oleyl imidazoline, octadecylethylmethylsulfonium methyl sulfate, dodecyl-bis-β-hydroxyethylsulfonium acetate, dodecylbenzyldimethylsulfonium chloride, dodecylbenzyltrimethylphosphonium chloride, S-p-dodecylbenzyl-N,N,N',N'-tetramethylisothiouronium chloride and the like.

Typical non-ionic emulsifiers (surfactants) are compounds formed by the reaction of an alkylene oxide, such as ethylene oxide, propylene oxide, or butylene oxide with long chain fatty alcohols, long chain fatty acids, alkylated phenols, long chain alkyl mercaptans, long chain alkyl primary amines, for example, cetylamine, the alkylene oxides being reacted in a ratio such as 5 moles to 20 moles or higher such as up to 50 moles per mole of the co-reactant. Similarly effective compounds are monoesters such as the reaction products of a polyethylene glycol with a long chain fatty acid, for example, glycerol monostearate, sorbitan trioleate, and partial and complete esters of long chain carboxylic acids with polyglycol ethers of polyhydric alcohols. By "long chain" in the above description is meant an aliphatic group having from six carbon atoms to 20 or more.

The preferred surfactants are surfactants having pH independent cationic groups and especially preferred are the fugitive surfactants such as cationic surfactants in which the cationic group is sulfonium, sulfoxonium, isothiouronium or a reducible quaternary nitrogen group, e.g., pyridinium, isoquinolinium and quinolinium.

The particles of the latexes of this invention, i.e., the starting latexes and the final products, generally are approximately spherical in shape and have a particle size (diameter) of from about 500 Angstroms to about 10,000 Angstroms.

The following examples illustrate ways in which the present invention can be practiced, but should not be construed as limiting the invention. All parts and percentages are by weight unless otherwise expressly indicated. The particle sizes shown in the examples are average particle diameters obtained by light scattering measurements, except as indicated.

EXAMPLE I

A thermoplastic acrylic latex is prepared in the following manner. A monomer mixture is prepared from 1072 grams of ethyl acrylate and 528 grams of methyl methacrylate and to this mixture is added 24 grams of dodecanethiol and 5 grams of an 82.7-percent solution of t-butyl hydroperoxide to form a monomer feed solution. A seed latex is prepared from 750 grams of a surfactant solution previously prepared by stirring 710 grams of water and 40.0 grams of 25-percent-active solution of dodecylbenzyldimethylsulfonium chloride for 2 hours under a stream of nitrogen to which is then added 25 grams of the monomer feed solution, followed by continuously-added reducing stream pumped for about 2 hours at a rate of 7.67 grams per hour, the stream being a portion of a solution previously prepared from 9 grams of hydroxylamine hydrochloride diluted to 500 grams with deionized water. To the seed latex is added monomer feed solution at a rate of 55 grams per hour with continuation of a reducing stream of the same rate of addition and composition as in the seed latex and concurrently pumping into the reaction mixture at the rate of 20 grams per hour a surfactant solution previously prepared from 400 grams of deionized water and 100 grams of a 25 percent active solution of dodecylbenzyldimethylsulfonium chloride. After 20 hours the conversion is about 85 percent, the continuous additions are discontinued, 15 grams of vinylbenzyl chloride is added and the reaction is allowed to continue for an additional 2 hours. The temperature is maintained at about 50° C throughout the reaction. There is obtained thereby a latex having a solids content of 47.6%, a pH of 2.8, a particle size of 1250 angstroms, and containing a polymer having a molecular weight of 74,000, the latex having a chloride ion content of 0.113 milliequivalent per gram of polymer.

EXAMPLE II

Latexes are prepared in a semi-continuous method according to the following description. Various compositions are prepared for addition in separate streams.
Initial aqueous solution
    8.75 grams of 85.5% aqueous solution of phosphoric acid
    1000 grams of water
    sufficient ammonium hydroxide to adjust the pH of above solution to 5.0
    20 grams (active basis) of dodecylbenzyldimethylsulfonium chloride
    sufficient water to provide 2000 grams of solution
    sufficient ammonium hydroxide to adjust the pH to 5.0
Continuous emulsifier stream
    125 grams (active basis) of dodecylbenzyldimethylsulfonium chloride
    sufficient water to provide 1000 grams of an aqueous solution containing 125 grams (active basis) of dodecylbenzyldimethylsulfonium chloride.
Continuous initiator stream
    500 grams of an aqueous solution containing 27.5 grams (active basis) of t-butylhydroperoxide.
Continuous reducing agent stream
    500 grams of an aqueous solution containing 14 grams of hydroxylamine hydrochloride.
First monomer solution
    1500 grams of butadiene
    1200 grams of styrene
    300 grams of butyl acrylate
    3 grams of dodecanethiol
Second monomer solution
    250 grams of butyl acrylate
    50 grams of vinylbenzyl chloride
    3 grams of dodecanethiol
Process The initial aqueous solution is placed in a 2-gallon Pfaudler reactor fitted with a crowfoot stirrer and the partially filled reactor is purged with nitrogen four times, then 100 grams of the first monomer solution is added, the pressure in the reactor is raised to 35 psig with nitrogen, and the temperature is raised to 50° C. The continuous initiator stream and the continuous reducing agent stream are started, each at the rate of 10 grams per hour. After three hours of such addition with agitation (at 235 rpm of the stirrer), the monomer solution and the continuous emulsifier stream are pumped into the reactor at rates of 40 grams per hour and 110 grams per hour, respectively, for a period of 19 hours. The continuous initiator stream, the continuous reducing agent stream and the continuous emulsifier stream are maintained while the second monomer solution is fed at the rate of 50 grams per hour for a period of 3 hours. The continuous initiator stream, the continuous reducing agent stream, the stirring and maintenance of polymerization temperature at 50° C are continued for an additional 45 minutes. A latex having 40.4 percent solids and a particle size of about 1120 Angstroms is obtained.

EXAMPLE III

Into a 2-gallon, glass-lined Pfaudler kettle fitted with a crowfoot agitator are loaded at room temperature, 230 parts of water, 1 part (active basis) of dodecylbenzyldimethylsulfonium chloride, 2 parts of 2,2'-azobisisobutyronitrile, and 0.1 part of dodecanethiol, the stirrer is started, the reactor is closed and the system is purged four times with nitrogen. Styrene (43 parts), butadiene (50 parts) and 2-hydroxyethyl acrylate (2 parts) are forced into the reactor by pressure and the reactor contents are heated to 50° C and held at that temperature for 20 hours. The temperature then is raised to 70° C and the reaction is allowed to continue for 2 hours, at which time the conversion is about 90 percent. Vinylbenzyl chloride monomer (5 parts) is added to the reactor and stirring at a temperature of 70° C is continued for two hours. The product is then cooled and removed from the reactor.

A latex is obtained having a solids content of 28.5 percent and a particle size of 1200 Angstroms. The latex is then vacuum stripped, after which the solids content of the latex is 32.6 percent.

EXAMPLE IV

A latex is prepared substantially as described for Example III except that the amount of vinylbenzyl chloride monomer is reduced to 2.5 parts and the styrene is correspondingly increased to 45.5 parts. The product is found to be a latex having 29.0 percent solids and a particle size of 1100 Angstroms. After vacuum stripping the solids content is found to be 31.3 percent.

EXAMPLE V

A precursor latex is prepared in a batch emulsion polymerization reactor using 2 percent of azobisisobutyronitrile as initiator, 1 percent of dodecylbenzyldimethylsulfonium chloride as surfactant and 0.1 part of dodecanethiol and 0.1 part of 2,6-di-t-butyl-p-cresol as chain transfer agents for each 100 parts of monomers. The initiator, surfactant, chain transfer agents, and 233 parts of water are loaded into the reactor. Two parts of 2-hydroxyethyl acrylate and 1.33 parts of styrene are added and the reactor is purged with nitrogen. Sufficient additional styrene to provide a total of 30 parts and 63 parts of butadiene are added, the temperature is raised to 50° C and held for 4 hours, then is increased to 70° C. and held until the rate of pressure drop levels, i.e., about 7 hours. Five parts of vinylbenzyl chloride is then added and the temperature is maintained at 70° C for an additional 2 hours. The reactor contents are stirred throughout the reaction period. After the reactor is vented and the reacted mixture is cooled, the product is found to be a fluid latex having a solids content of 27.7 percent, a particle size of 1250 Angstroms and a pH of 3.7. Sufficient dodecylbenzyldimethylsulfonium chloride is added to raise the total to 0.2 milliequivalent of sulfonium ion per gram of polymer to form Latex V.

An amount of 5-percent aqueous solution of methyl cellulose sufficient to thicken the latex to coating consistency is added to Latex V. One portion of the thickened latex (V-A) is coated onto an aluminum panel using a 5-mil casting bar, is allowed to dry, then is cured in an air oven for 20 minutes at 175° C. Another portion of the thickened latex (V-B) is coated onto a glass panel in the same manner but is cured in a vacuum oven at reduced pressure for 1 hour at 150° C. The cured coatings of V-A and V-B are clear, colorless, adherent films. The panels having cured coatings of V-A and V-B are immersed in water at 70° C for 60 minutes then are removed from the water and are blown dry with air. A pressure sensitive tape (No. 600, manufactured by Minnesota Mining and Manufacturing Co.) is applied to each of the panels. No coating is removed from either of the panels when the tape is rapidly pulled off.

Another portion of thickened Latex (V-C) is coated onto a glass panel in the same manner as described for V-B but is cured at 175° C for 5 minutes. Comparative Material C-1, a latex of a copolymer of 43 percent of styrene, 55 percent of butadiene and 2 percent of 2-hydroxyethyl acrylate, is coated onto a glass panel and is cured in the same manner. The resulting coated glass panels are soaked in a 12.5 percent aqueous solution of trimethylamine for 1 hour at ambient temperature. Both coatings continue to adhere to the glass during and after the soaking. The panel from V-C, however, is much more hydrophilic than the panel from Comparative Material C-1, i.e., is wet much more easily by water.

EXAMPLE VI

With another portion of Latex V is mixed a 50-percent aqueous dispersion of pigment at a ratio of 40 parts of latex to 60 parts of pigment, calculated on a solids basis. The pigment dispersion is previously prepared from 96 parts of titanium dioxide, 3 parts of zinc oxide and 1 part of carbon black with the aid of a ball mill, using one milliequivalent of dodecylbenzyldimethylsulfonium chloride as dispersant for each gram of pigment.

The pigmented latex is applied to a redwood board by means of a 5-mil casting bar and is dried at room temperature for about 24 hours. The resulting gray coating has good adhesion, good hiding power and good water resistance.

EXAMPLE VII

A latex is prepared in a batch recipe by an emulsion polymerization reaction of 40 parts of styrene and 55 parts of butyl acrylate in 300 parts of water using 0.2 part of dodecanethiol, 2 parts of azobisisobutyronitrile and 5 parts of dodecylbenzyldimethylsulfonium chloride with stirring for 17 hours at 50° C and one hour at 70° C to provide a monomer conversion of about 90 percent, then 5 parts of 2-bromoethyl methacrylate is added and the same reaction conditions are maintained for an additional 2 hours. After the reactor is vented and cooled, the product is found to be a fluid latex having a solids content of 25.7 percent, aand a particle size of 1070 Angstroms.

EXAMPLE VIII

A latex is prepared by an emulsion polymerization reaction of 40 parts of styrene, 55 parts of butyl acrylate in 300 parts of water using 0.2 parts of dodecanethiol, 2 parts of azobisisobutyronitrile, and 4 parts of dodecylbenzyldimethylsulfonium chloride with stirring for 18 hours at 50° C and 2 hours at 70° C to provide a monomer conversion of about 90 percent, then 5 parts of 2-chloromethylbutadiene is added and the same reaction conditions are maintained for an additional 2 hours. After the reactor is vented and cooled, the product is found to be a fluid latex having a solids content of 24.3 percent and a particle size of 1450 Angstroms.

EXAMPLE IX

A latex is prepared by an emulsion polymerization reaction of 50 parts of methyl methacrylate and 45 parts of butylacrylate in 300 parts of water using 0.2 part of dodecanethiol, 2 parts of azobisisobutyronitrile and 4 parts of dodecylbenzyldimethylsulfonium chloride with stirring for 16 hours at 50° C and 3 hours at 70° C to provide a monomer conversion of about 90 percent, then 5 parts of vinyl bromide is added and the same reaction conditions are maintained for an additional 2 hours. After the reactor is vented and cooled, the product is found to be a fluid latex having a solids content of 23.8 percent and a particle size of 1490 Angstroms.

EXAMPLE X

A latex is prepared by batch emulsion polymerization of 54 parts of styrene, 44 parts of butadiene and 2 parts of 2-hydroxyethyl acrylate using 0.1 part of dodecanethiol as chain transfer agent, 2,2'-azobisisobutyronitrile as catalyst, 1 part of dodecylbenzyldimethylsulfonium chloride as emulsifier and a polymerization time of 3 hours at 50° C and 7 hours at 70° C. After being cooled and filtered through cheesecloth, the resulting initial latex, having a solids content of 37.9 percent, is allowed to stand for 18 months. As determined by examination with a microscope, the latex particles are relatively uniform in size and shape and have an average particle diameter of 1265 Angstroms. Sufficient deionized water is mixed with 1980 parts (wet basis) of the initial latex to provide 4000 parts by weight of diluted latex. The diluted latex and 10 parts of 2,2'-azobisisobutyronitrile are placed in a reactor which is then purged with nitrogen. After the reactor contents are heated to 50° C, a monomer mixture containing 200 parts of styrene and 50 parts of vinylbenzyl chloride is forced into the reactor by pressure. The temperature of the reactor contents is then raised to 70° C and maintained for four hours while the contents are stirred. After the resulting product is cooled and filtered, it is found that a latex containing 21.0 percent of solids is obtained. As determined by examination with a microscope, the latex particles are relatively uniform in size and have an average diameter of 1444 Angstroms. No evidence is found by comparison of the micrograph of the initial latex with the micrograph of the latex product that any new particles are initiated. The latex product contains 0.042 milliequivalent of chloride ion per gram of solids (from the emulsifier).

What is claimed is:

1. An aqueous colloidal dispersion of structured particles having activated halogens at or near their surface, said particles consisting of a nonionic, organic polymer core having adhered thereto a thin layer of water-insoluble copolymer of an ethylenically unsaturated, nonionic monomer which is devoid of an activated-halogen and a nonionic emulsion polymerizable, oil-soluble, ethylenically unsaturated, activated-halogen monomer which does not inhibit free-radical polymerization, can diffuse through an aqueous medium and does not hydrolyze readily in such aqueous medium; said thin layer having a thickness of from a monomolecular layer to about 100 Angstroms; the amount of said activated-halogen monomer copolymerized in the thin layer ranging from about 0.01 milliequivalent to about 1.4 milliequivalent per gram of particles in the dispersion and not more than 3.0 milliequivalents for each gram of copolymer in the thin layer; said dispersion being stabilized by a small, stabilizing amount up to about 0.25 milliequivalent per gram of structured particles of a cationic surfactant or blend of cationic and nonionic surfactants.

2. The aqueous colloidal dispersion of claim 1 in which the organic polymer core is an emulsion polymer of non-ionic, ethylenically unsaturated monomers.

3. The aqueous colloidal dispersion of claim 1 in which the organic polymer core is a polymer of ethylenically unsaturated hydrocarbon monomers.

4. The aqueous colloidal dispersion of claim 1 in which the organic polymer core is a polymer of a non-ionic derivative of an ethylenically unsaturated carboxylic acid.

5. The aqueous colloidal dispersion of claim 3 in which the organic polymer core is a copolymer of styrene.

6. The aqueous colloidal dispersion of claim 3 in which the organic polymer core is a copolymer of butadiene.

7. The aqueous colloidal dispersion of claim 1 in which the organic polymer core is a polymer of an acrylic ester.

8. The aqueous colloidal dispersion of claim 1 in which the organic polymer core is a polymer of a methacrylic ester.

9. The aqueous colloidal dispersion of claim 1 in which the activated-halogen monomer is vinylbenzyl chloride.

10. In a latex comprising an aqueous colloidal dispersion of a nonionic, organic polymer in the form of particles having a surface on which is adsorbed a surfactant and having a particle diameter of from about 500 Angstroms to about 10,000 Angstroms, the improvement comprising particles which are structured particles having activated-halogens chemically bound to the particle at or near the surface and the surfactant being a cationic surfactant or a blend of cationic and nonionic surfactants; said structured particles consisting of a non-reactive, nonionic, organic polymer core encapsulated with a thin layer of a water-insoluble copolymer of an ethylenically unsaturated, nonionic monomer which is devoid of an activated-halogen and a nonionic, emulsion polymerizable, oil-soluble ethylenically unsaturated, activated-halogen monomer which does not inhibit free-radical polymerization, can diffuse through an aqueous medium and does not hydrolyze readily in such aqueous medium; said thin layer having a thickness of from a monomolecular layer to about 100 Angstroms; the amount of said activated-halogen monomer copolymerized in the thin layer ranging from about 0.01 milliequivalent to about 1.4 milliequivalent per gram of particles in the dispersion and not more than 3.0 milliequivalents for each gram of copolymer in the thin layer; the surfactant being used in a small, stabilizing amount up to about 0.25 milliequivalent per gram of structured particles.

11. A method for preparing a structured-particle latex comprising the steps of
a. providing a temperature of from about 0° C to about 80° C, agitation and a free radical producing means in a preformed latex containing a small, stabilizing amount of a cationic surfactant or a mixture of a cationic surfactant and a nonionic surfactant but devoid of an anionic surfactant, the amount of the surfactant being less than the amount required to initiate new particles in the presence of additional monomer,
b. providing in admixture with the preformed latex an ethylenically unsaturated, non-ionic monomer which is devoid of an activated-halogen and a nonionic, emulsion polymerizable, oil-soluble, ethylenically unsaturated, activated-halogen monomer which does not inhibit free-radical polymerization, can diffuse through an aqueous medium and does not readily hydrolyze in such aqueous medium; said activated-halogen monomer being provided in such a manner that the ratio of the activated-halogen monomer to total polymer is kept low at any given time, and
c. maintaining the temperature and agitation until polymerization of the monomers is substantially complete;
whereby there is formed a latex containing structured particles having activated-halogens chemically bound to the particle at or near the particle surface.

12. The method of claim 11 in which the preformed latex is prepared in situ by emulsion polymerization of ethylenically unsaturated, nonionic monomers to a conversion from about 85 percent to about 95 percent, wherein the unpolymerized monomers constitute the non-ionic monomer for step (b).

13. The method of claim 11 in which the preformed latex is a previously prepared latex having substantially no residual unpolymerized monomers.

14. The method of claim 11 which has an additional step: (d) and thereafter adding stabilizing amounts of a cationic surfactant or an non-ionic surfactant, or a mixture thereof.

15. The method of claim 11 in which the temperature is from about 50° C to about 70° C.

16. The method of claim 11 in which (a) the non-ionic monomer which is devoid of an activated-halogen and (b) the activated-halogen monomer are added as a mixture to the preformed latex.

17. The aqueous colloidal dispersion of claim 1 in which the activated-halogen monomer is selected from the group consisting of vinylbenzyl chloride, 2-chloromethylbutadiene, vinyl bromide, a bromoalkyl acrylate and a bromoalkyl methacrylate.

* * * * *